United States Patent Office 3,229,270
Patented Jan. 11, 1966

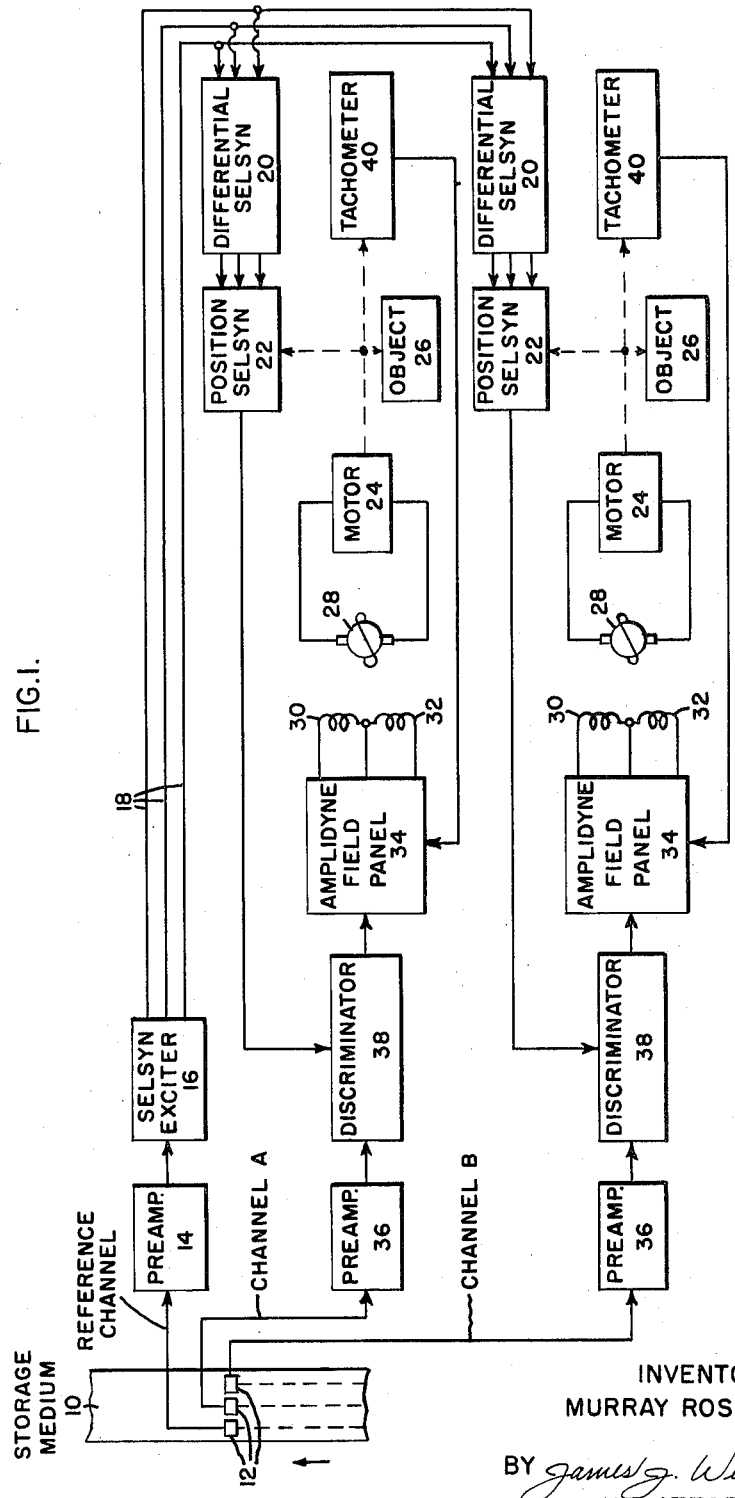

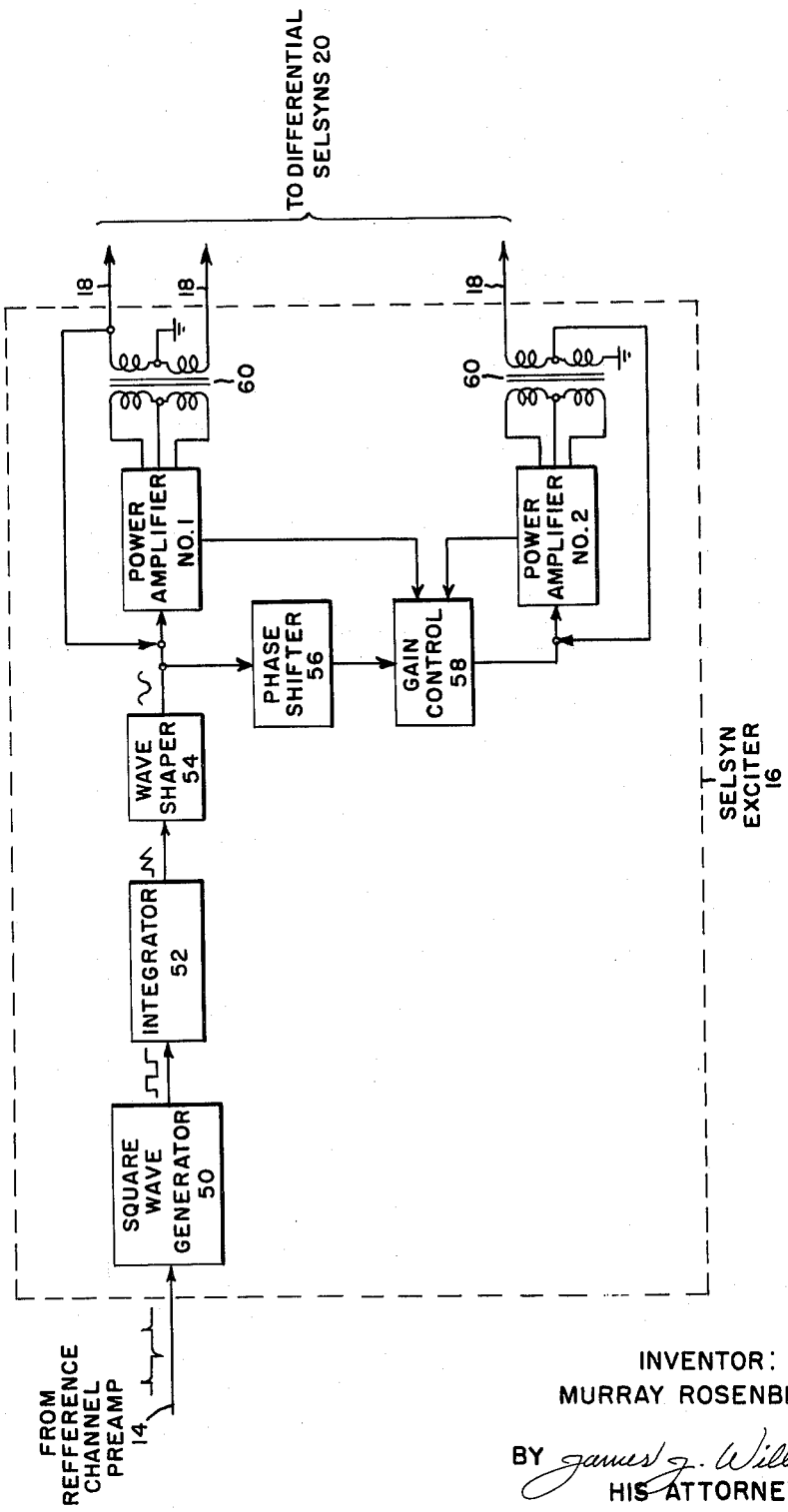

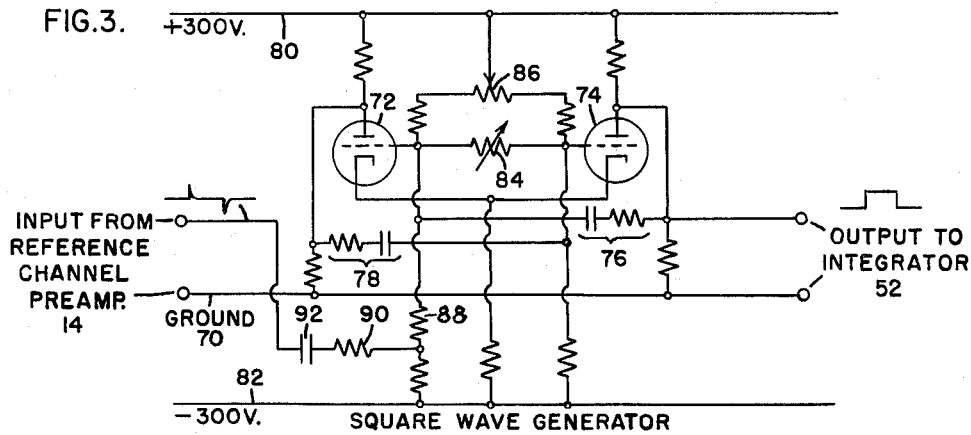
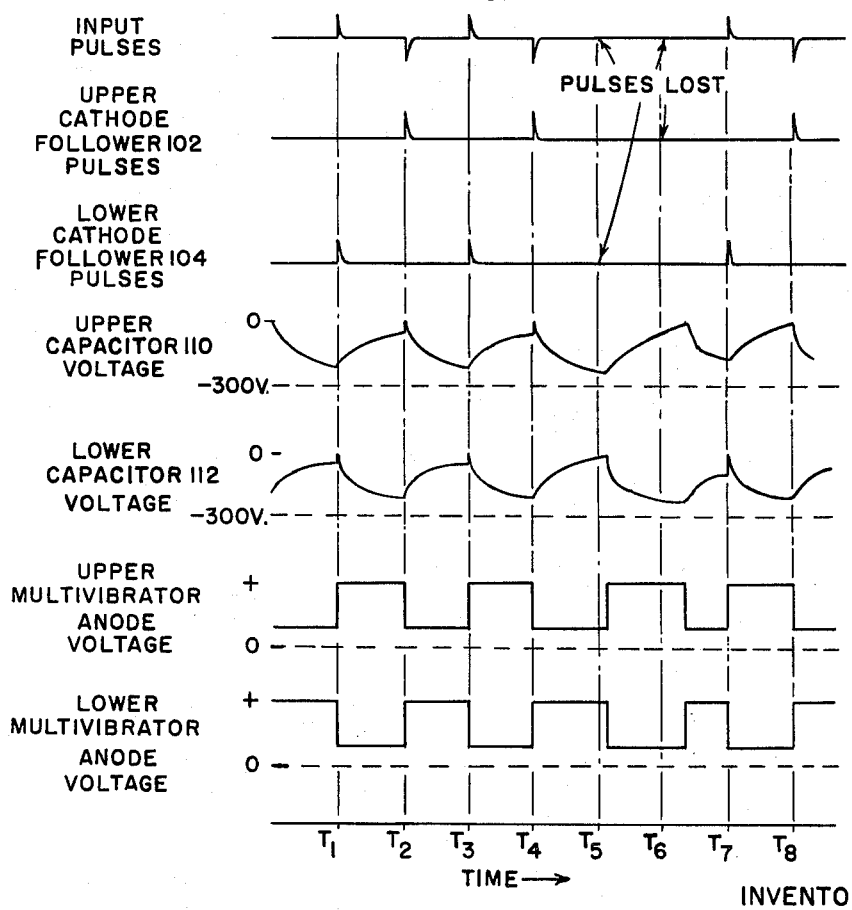

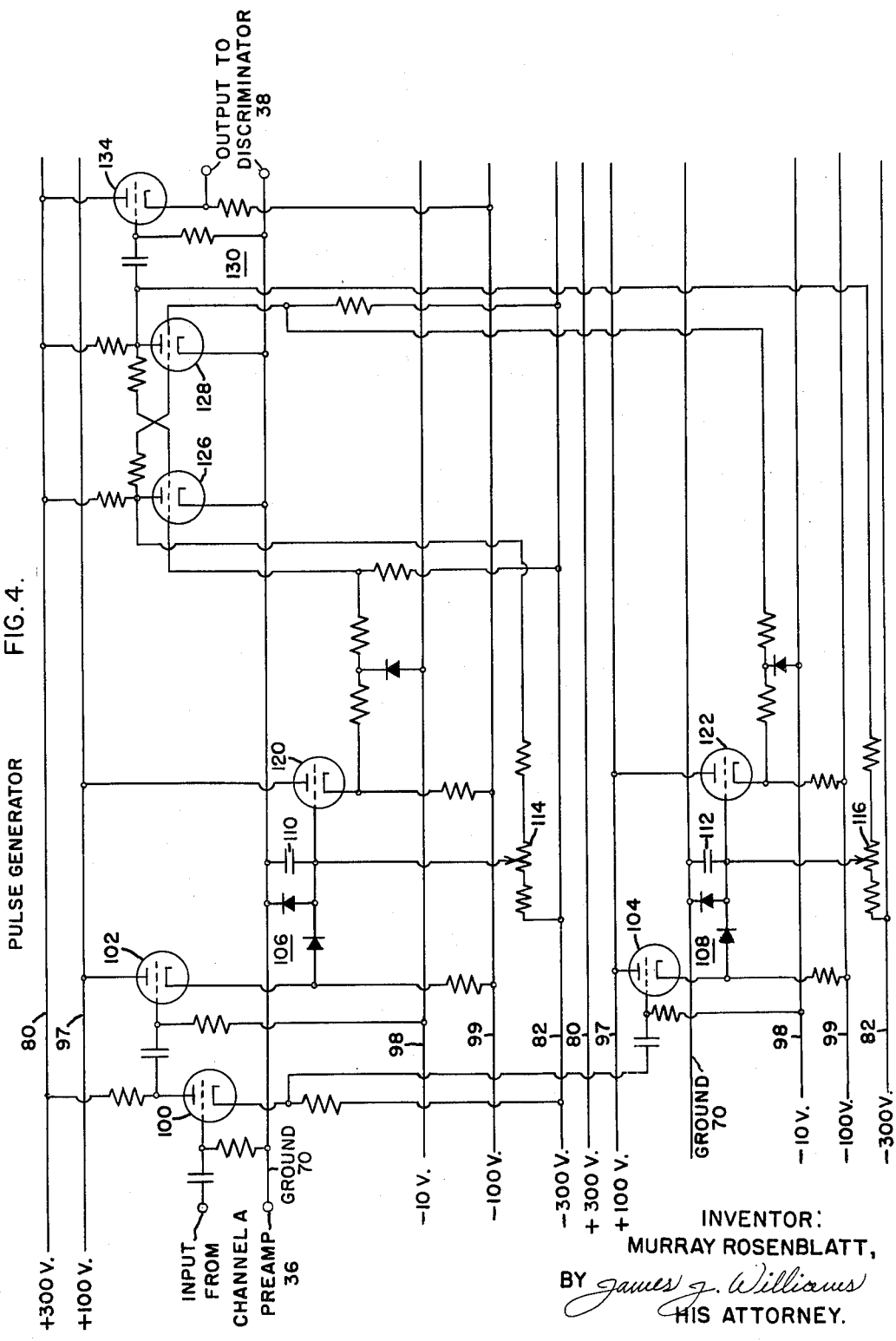

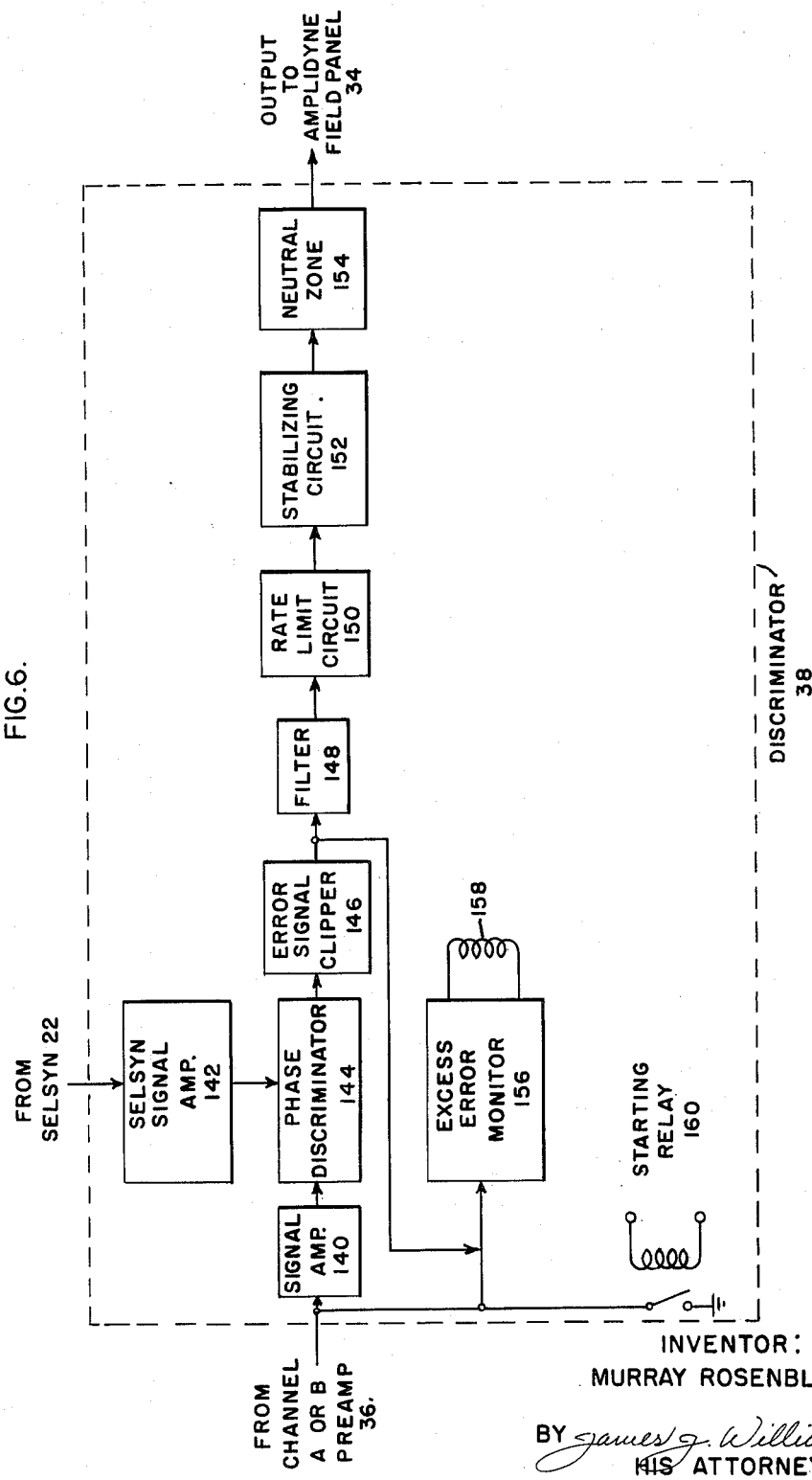

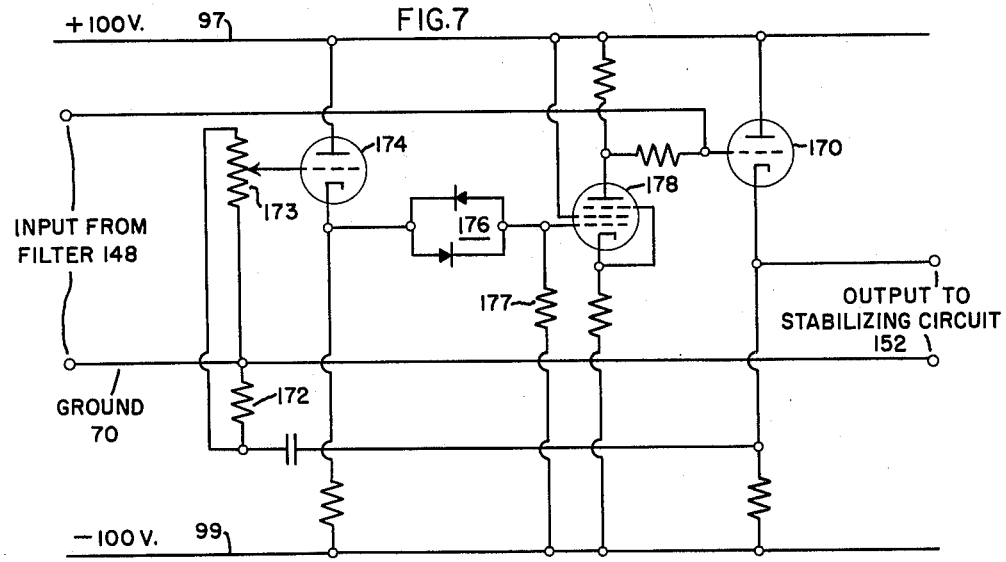
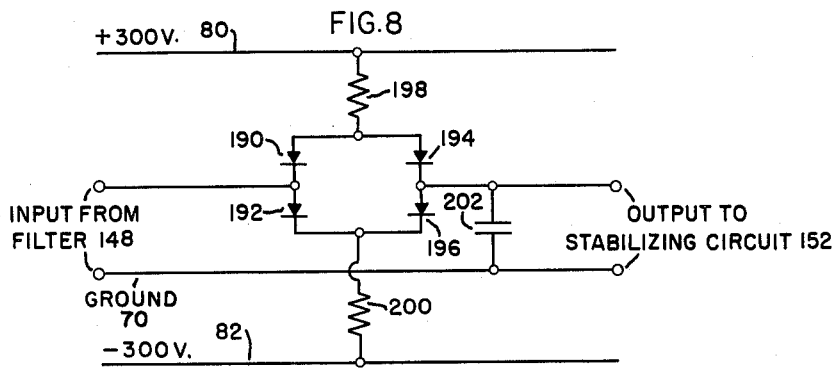
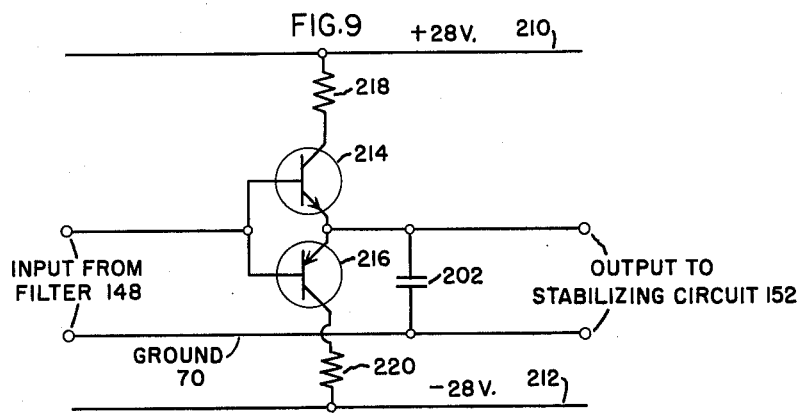
INVENTOR:
MURRAY ROSENBLATT,
BY James G. Williams
HIS ATTORNEY.

3,229,270
ARRANGEMENT FOR REDUCING ERRORS RESULTING FROM SIGNAL FAULTS OR OMISSIONS
Murray Rosenblatt, Cherry Hill, N.J., assignor to General Electric Company, a corporation of New York
Continuation of application Ser. No. 62,208, Oct. 12, 1960. This application Sept. 15, 1964, Ser. No. 398,834
12 Claims. (Cl. 340—174.1)

The invention relates to improvements in programmed control systems, and particularly to such an improvement for reducing errors resulting from faults in the signals derived from the programmed information. More particularly, the invention relates to arrangements for reducing the errors which may result from faults or omissions in the signals provided in a programmed control system such as described in Patents Nos. 2,537,770; 2,866,145; 2,894,253; and 2,922,052. This application is a continuation of my copending application, now abandoned, entitled "Arrangement for Reducing Errors Resulting From Signal Faults or Omissions," filed October 12, 1960, Serial No. 62,208.

As described in these patents, the position or operation of a machine tool or other device may be controlled in a system which operates in accordance with information stored on a data storage medium, such as a magnetic tape. The stored information is characterized by the operations desired, and when this information is reproduced, the machine tool or other device is operated or moved in accordance with this stored information to accomplish the desired result. The stored information is reproduced through suitable means when it is desired to bring about the operation characterized or determined by the stored information. The systems shown in the patents provide a reference signal and also provide a control signal for each motion or operation which it is desired to effect or bring about. Means are provided for developing a signal which is indicative of the true position or operation of the object being controlled. The signals indicative of the true position or operation of the device being controlled and the control signal for each channel or motion or operation which is being controlled are fed to a discriminator or other device for developing an error signal indicative of the deviation between the true position or operation and the programmed position or operation. Through suitable positioning or operating means, the error signal is supplied to the device in order that it may assume the correct programmed operation or programmed position. On occasions, the information stored is not faithfully reproduced, or in some cases it may not be reproduced at all for a brief period of time. In the system, it is desirable, if not necessary, that movement or operation continue during the brief fault or absence of such stored information so as to preserve the work and continue the operation.

Accordingly, an object of the invention is to provide an arrangement whereby a control system operating from stored information may continue operation despite a brief fault in or absence of the stored information.

Another object of the invention is to provide an arrangement for a control system operating from stored information which permits continued operation of the system despite loss of or faults in the stored information, the continued operation being substantially similar to the operation prior to the loss of or faults in the stored information.

In addition to loss of or faults in the stored information, transient signals arising from a number of extraneous causes and conditions may be present. Such transient signals may serve to introduce false operation of the control system, this false operation resulting in imperfect work, or operation.

Accordingly, another object of the invention is to provide an arrangement which limits the rate at which signals used in a programmed control system can change.

Briefly, these and other objects of the invention are achieved in a programmed control system by the provision of means which respond to signals from the storage medium and normally produce appropriate signals in response thereto. In accordance with the invention however, these means are so arranged that in the absence of signals from the storage medium, appropriate signals will continue to be produced for some duration of time. The means may, in accordance with the invention, be self-sustaining and produce signals at a predetermined rate, or they may be so arranged that they are self-sustaining and produce signals at a rate dependent upon the rate of the signals derived from the storage medium just prior to their being lost or omitted.

In another embodiment of the invention, the programmed control system is provided with means which limit the rate of change of signals from the storage medium for producing the desired positioning or the desired operation. Thus, if signals from the storage medium are absent or are of such a characteristic, or if extraneous signals which are present and are of such a characteristic that an undesirable operation, such as an increase in speed, were to take place, the rate limit means of the invention limits the rate of change to some predetermined level or value.

The subject matter of the invention is particularly pointed out and distinctly claimed in the concluding portion of the specification. The invention, however, both as to its arrangement and method of operation, together with additional objects and advantages, may be better understood by reference to the following description taken in connection with the accompanying drawing. In the drawing:

FIGURE 1 shows a block diagram of a programmed control system in which the invention may be used;

FIGURE 2 shows a block diagram of a selsyn exciter in which the invention may be used, the selsyn exciter being a portion of the control system shown in FIGURE 1;

FIGURE 3 shows a circuit diagram of a square wave generator in accordance with the invention which may be used in the selsyn exciter shown in FIGURE 2;

FIGURE 4 shows a circuit diagram of a generator in accordance with another embodiment of the invention which may be used in the control system shown in FIGURE 1;

FIGURE 5 shows waveforms for explaining the operation of the circuit shown in FIGURE 4;

FIGURE 6 shows a block diagram of a discriminator in which the invention may be used, the discriminator being a portion of the control system shown in FIGURE 1; and FIGURES 7, 8, and 9 show circuit diagrams of rate limit circuits in accordance with the invention and which may be used in the discriminator shown in FIGURE 6.

In FIGURE 1, there is shown a programmed control system similar to those disclosed in the previously mentioned patents. Since the system shown is described in detail in the patents mentioned, the operation will be only briefly described here. A storage medium 10, such as a magnetic tape, is provided. The storage medium 10 is provided with a plurality of channels, only three being shown by dashed lines in the interests of clarity. However, additional channels, representing additional operations, may be provided on the storage medium 10. Previously determined information may be recorded on the storage medium 10, and reproduced by suitable pickup heads 12 appropriately positioned with respect to their respective channels. One of the pickup heads 12 is associated with a reference channel, and the other two pickup heads 12 are associated with channels respectively labeled channel A and channel B. These channels A and B may represent any desired operation, such as movement in mutually perpendicular directions. It is to be understood that the storage medium 10 represented in FIGURE 1 as being a magnetic tape is for the purposes of illustration only, because any suitable storage device may be used. Likewise, it is possible that the arrangement shown may be used in other applications in addition to that shown or contemplated. Signals derived by the pickup head 12 associated with the reference channel are applied to a preamplifier 14, after which they are applied to a selsyn exciter 16. The selsyn exciter 16 develops an output signal or signals having at least two phases. As illustrated in FIGURE 1, output signals of three phases are derived and applied to the conductors 18 which supply these signals to differential selsyns 20 respectively associated with the channels A and B. The differential selsyns 20 are, in turn, respectively coupled to position indicating selsyns 22. As illustrated by the dashed lines, the position indicating selsyns 22 are mechanically connected to respective positioning motors 24 which, in the example mentioned, may provide mechanical movement of an object 26 or objects 26 in mutually perpendicular directions. A motor controlled unit, such as an amplidyne 28 or other power amplifier, furnishes a motor control signal, the direction and magnitude of which is determined by the forward and reverse windings 30, 32 respectively energized by an amplidyne field panel 34. While the arrangement shown is directed essentially to an electronic and electrical positioning system, it is to be understood that mechanical systems, such as those of a hydraulic nature, may be used.

Control signals having predetermined phase relationships with reference signals as provided by the storage medium 10 are derived from the respective channel A and channel B pickup heads 12 and amplified in suitable preamplifiers 36. The amplified signals are applied to respective discriminators 38, to which signals from the position indicating selsyns 22 are also applied. These signals from the position indicating selsyns 22 have a phase relationship with respect to the reference signals which is indicative of the true position of the objects 26. The position indicating selsyns 22 are coupled to the discriminators 38 which develop error signals indicative of the phase relationship between the signals from the position indicating selsyns 22 and the signals provided by channels A and B of the storage medium 10. The error signals are applied to the respective amplidyne field panels 34. Tachometers 40 are mechanically coupled to the motors 24 to furnish a velocity stabilizing signal which is also applied to the amplidyne field panels 34.

FIGURE 2 shows a block diagram of the selsyn exciter 16 shown in FIGURE 1. The block diagram of the selsyn exciter 16 is shown to illustrate how the invention may be used in the selsyn exciter 16. The selsyn exciter 16 provides a plurality of sinusoidal alternating current electrical signals having a predetermined phase relationship with respect to each other from the reference signals derived from the storage medium 10. Since the selsyn exciter 16 shown in FIGURE 2 is explained in Patent Nos. 2,894,253 and 2,922,052 in some detail, a detailed explanation of the selsyn exciter 16 will be omitted here. However, a brief explanation follows. The selsyn exciter 16 includes a square wave generator 50 which is exemplified as being a bistable multivibrator that is operated in response to the reference signals derived from the storage medium 10 after amplification by the preamplifier 14. Thus, operation of the selsyn exciter 16 as contemplated by the patents is dependent upon the reference signals being received. The reference signals derived from the storage medium 10 consist of positive and negative-going pulses which are applied to the square wave generator 50. The square wave generator 50 produces square or rectangular waves in response to the pulses as shown, and these square waves are applied to an integrator 52 which develops a triangular wave and supplies it to a wave shaper 54. The wave shaper 54 forms the integrated wave which is triangular into a substantially sinusoidal wave and applies this sinusoidal wave to a power amplifier No. 1 and to a phase shifter 56. The output of the phase shifter 56 is applied to the power amplifier No. 2 through a gain control 58, this gain control 58 receiving signals from both power amplifiers Nos. 1 and 2 for the purpose of maintaining the desired relative amplitude between the two sinusoidal waves applied to the power amplifiers. After amplification in the power amplifiers, these signals are applied to Scott-connected transformers 60 which provide three-phase signals on the conductors 18. These signals are applied to the differential selsyns 20.

The square wave generator 50 which is shown in the patents mentioned depends upon the reference signals being received. In the absence of such reference signals, the square wave generators cease to function so that no signals or unsuitable signals are provided by the selsyn exciter 16. In accordance with the invention, however, a square wave generator is provided which continues to produce square wave pulses for a predetermined length of time even in the absence of signals from the reference channel. FIGURE 3 shows a circuit diagram of a square wave generator in accordance with the invention which may be used with the selsyn exciter 16 shown in FIGURE 2. The square wave generator of FIGURE 3 comprises two vacuum tubes 72, 74 having respective anodes, cathodes, and control grids. It is to be understood that other electron discharge devices, such as transistors, may be used in place of the tubes. The anode of each of the tubes 72, 74 is coupled to the control electrode of the other tube through series connected resistor-capacitor networks 76, 78. The anodes of the tubes 72, 74 are appropriately connected to a +300 volts bus 80 and the cathodes of the tubes 72, 74 are appropriately connected to a −300 volts bus 82. The buses 80, 82 supply direct current potentials which are positive and negative with respect to a reference or ground bus 70. The values of voltage shown in FIGURE 3, as well as in subsequent figures, are exemplary only, and are not intended to limit the invention in any way. The control electrodes are connected together through a frequency determining potentiometer 84 and are appropriately connected to the +300 volts bus 80 through resistors and through a balancing potentiometer 86. The control electrodes are also connected to the −300 volts bus 82.

The circuit of FIGURE 3 as described thus far provides, in effect, an astable or free-running multivibrator whose frequency is determined by the values of the circuit components. In the absence of signals from the reference channel preamplifier 14, the circuit shown operates to produce square waves at the output which is connected to the integrator 52. However, in order to make the square wave generator responsive to such signals when they are present, signals from the reference channel preamplifier 14 are applied, with respect to the ground bus 70, to the control electrode of one of the tubes, the left-hand tube 72, for example. These signals are applied through a serially connected network comprising two resistors 88, 90 and a capacitor 92. The input signals supplied to the square wave generator of FIGURE 3 may take the form as shown and comprise positive and negative-going pulses. Upon receipt of a positive-going pulse, the left-hand tube 72 is turned on, with the result that its anode potential falls. This fall in anode potential is applied to the control electrode of the right-hand tube 74 to cut it off so that its anode potential rises in accordance with the usual multivibrator action. If the predetermined or normal free-running frequency of the multivibrator shown in FIGURE 3 is lower than the frequency of the input signals, the next negative-going pulse from the preamplifier 14 causes the left-hand tube 72 to be cut off and thus its anode potential rises. This rise in anode potential is coupled to the control electrode of the right-hand tube 74 to turn it on, with the result that its anode potential falls. Thus, the square wave generator of FIGURE 3 provides square wave signals having a frequency which is responsive to the frequency of the incoming signals. However, in the absence of such incoming signals, the square wave generator continues to operate at its inherent or normal ferquency determined by the values of the networks 76, 78 as well as the other circuit components. Thus, square wave signals will be provided to the integrator 52 both in the presence of and in the absence of signals from the reference channel preamplifier 14.

The problems of pulse restoration in an information channel, such as channels A or B in FIGURE 1, are more complicated than in a reference channel where the pulses are provided at a substantially constant frequency. In the case of an information channel, the pulse frequency may vary in accordance with the information being conveyed, such as faster or slower operation or different positions. Normally, however, the operation of the device being controlled does not change instantly but preferably changes gradually (corresponding to some predetermined maximum rate of acceleration). Thus, the pulse frequency, although a variable, varies slowly at the input of the discriminator 38 shown in FIGURE 1. In accordance with the invention, a pulse generator may be provided between the channel preamplifier 36 and the discriminator 38 of any or all of the information channels shown in FIGURE 1. This generator provides pulses having a frequency determined by the input pulses supplied thereto from the information channels. In the absence of such input pulses, the generator in accordance with the invention provides pulses which have substantially the same frequency as the input pulses just prior to their loss or absence, and which gradually decrease in frequency until such time as the pulses are again supplied. FIGURE 4 shows a circuit diagram of this generator in accordance with the invention, and FIGURE 5 shows waveforms for explaining the operation of the generator of FIGURE 4. In the embodiment shown in FIGURE 4, electron discharge tubes of the triode variety are used. However, it is to be understood that other electron discharge devices, such as transistors, may also be used. Suitable potentials are provided for the generator of FIGURE 4 by the +300 volts bus 80, the −300 volts bus 82, the ground bus 70, a +100 volts bus 97, a −10 volts bus 98, and a −100 volts bus 99. These buses supply direct current potentials of the magnitudes and polarities indicated with respect to the ground bus 70. Pulses are supplied to an input circuit from the preamplifier 36, and are applied to the control electrode or grid of a phase splitter tube 100. Output signals from the phase splitter tube 100 are derived at its anode and its cathode and respectively applied to the control electrode of an upper cathode follower tube 102 and the control electrode of a lower cathode follower tube 104. The outputs of the upper and lower cathode follower tubes 102, 104 are respectively applied through an upper diode network 106 and a lower diode network 108 to upper and lower timing capacitors 110, 112 respectively. One end of the upper and lower timing capacitors 110, 112 is coupled to the ground bus 70, and the other ends are respectively coupled to the diode networks 106, 108. The other end of the upper and lower timing capacitors 110, 112 are also coupled through respective potentiometers 114, 116 and resistors to the −300 volts bus 82. And, the other ends of the timing capacitors 110, 112 are also respectively coupled to upper and lower coupling tubes 120, 122. The output electrodes, in this case the cathodes, of the upper and lower coupling tubes 120, 122 are respectively coupled through resistor and diode networks to the control electrodes of multivibrator tubes 126, 128. The multivibrator tube 126 will be referred to as the upper multivibrator tube, and the multivibrator tube 128 will be referred to as the lower multivibrator tube because their control electrodes are respectively coupled to the upper and lower coupling tubes 120, 122 and associated circuitry. The multivibrator tubes 126, 128 are connected as a bistable multivibrator circuit, and hence the anode of each tube is coupled through a direct current path including a resistor to the control electrode of the other tube. Thus, when one state of conduction is present, that state continues until such time as an external signal is applied to one of the control grids of the multivibrator tubes 126, 128. The output signals from the generator of FIGURE 4 are derived from the anode of the lower multivibrator tube 128 and are applied, if desired, through a differentiating network 130 to the control electrode of an output cathode follower tube 134. Output signals are derived between the cathode of the output tube 134 and ground bus 70 and may be applied to the discriminator 38 shown in FIGURE 1.

The operation of the generator shown in FIGURE 4 will be explained in connection with the waveforms shown in FIGURE 5. In FIGURE 5, waveforms are shown as plotted against time intervals bearing the designation T followed by a subscript numeral. At some time prior to the time $T_1$, it is assumed that the circuit is in operation, and that input pulses conveying some information (such as needed to produce an operation or motion) are being supplied to the phase splitter tube 100. These pulses are designated input pulses. A positive-going input pulse causes the cathode potential of the phase splitter tube 100 to rise, and causes the anode potential of the phase splitter tube 100 to fall. Likewise, a negative-going pulse causes the cathode potential of the phase splitter tube 100 to fall and causes the anode potential of the phase splitter tube 100 to rise. The upper and lower cathode follower tubes 102, 104 are normally in some stable condition as determined by the values of the circuit components. A postive-going input pulse causes the cathode potential of the lower cathode follower tube 104 to rise, and a negative-going pulse causes the cathode potential of the upper cathode follower tube 102 to rise. At some time prior to time $T_1$, the upper multivibrator tube 126 is turned on and the lower multivibrator tube 128 is cut off The relatively high anode voltage of the lower multivibrator tube 128 is coupled back to the lower capacitor 112 so that the lower capacitor 112 is discharging toward zero. The relatively low anode voltage of the upper multivibrator tube 126 is fed back to the upper capacitor 110 and is so low that the upper capacitor 110 is charging toward the voltage on the −300 volts bus 82. These charging and discharging paths are indicated by the upper and lower capacitor voltage waves in FIGURE 5. Upon receipt of a positive-going input pulse at time $T_1$, the lower cathode follower 104 applies a positive-going pulse through the diode network 108 to the lower capacitor 112. This positive-going pulse serves to cause the lower capacitor 112 to discharge quickly, as indicated by the small spike on its voltage wave at the time $T_1$. When the lower capacitor 112 is discharged, the lower coupling tube 122 is rendered conductive so that its cathode voltage rises. This rise in voltage is applied to the control grid of the lower multivibrator tube 128 which is turned on. Through typical multivibrator action, the upper multivibrator tube 126 is cut off, and hence its anode voltage becomes relatively high. This relatively high voltage is coupled back through the potentiometer 114 to the upper capacitor 110 so that the upper capacitor 110 may then begin to discharge toward zero. The lower capacitor 112 begins to charge toward the voltage on the −300 volts bus 82. At time $T_2$, a negative-going pulse appears at the input, and causes the upper cathode follower 102 to provide a positive-going pulse to the upper capacitor 110 and quickly discharges this upper capacitor 110. The upper coupling tube 120 is turned on and its cathode becomes relatively positive to cause the upper multivibrator tube 126 to be turned on. When the upper multivibrator tube 126 is turned on, the lower multivibrator tube 128 is cut off. When the lower multivibrator tube 128 is cut off, its anode voltage becomes relatively high which, when fed back through the lower potentiometer 116, permits the lower capacitor 112 to begin to discharge toward zero. This operation continues, and the output pulses are derived through the discriminator circuit 130 and the output tube 134.

However, if at time $T_5$ a pulse is lost, no positive-going pulse appears at the cathode of the lower cathode follower tube 104 to discharge the lower capacitor 112. Hence, the lower capacitor 112 continues to discharge until at some time slightly after time $T_5$ the lower coupling tube 122 is turned on to cause the lower multivibrator tube 128 to be turned on also. At this time, the upper multivibrator tube 126 is cut off so that the upper capacitor 110 then begins to discharge toward zero. If at time $T_6$ a negative-going pulse fails to appear, the upper capacitor 110 continues to discharge and reaches some value at a time after time $T_6$ which turns on the upper coupling tube 120. This causes the upper multivibrator tube 126 to turn on. At this time, the multivibrator switches and the lower multivibrator tube 128 is cut off. Hence, the lower capacitor 112 begins to discharge toward zero. However, at time $T_7$, another input pulse appears so that the lower capacitor 112 is discharged at the proper time and the operation continues normally as explained. Thus, it will be seen that the generator shown in FIGURE 4 provides output pulses of the same frequency as the input pulses, and provides output pulses of substantially the same frequency as the input pulses just prior to their being lost or omitted. The time interval of the output pulses is determined by the previous length of time (when input pulses were present) during which time the timing capacitor had been charging.

Another arrangement for allowing a programming control system to operate in the absence of input pulses is to limit the rate at which velocity commands to the amplidyne field panel 34 can change. For example, if, in an information channel, a maximum acceleration of 1.5 inches per second per second were imposed, and if pulses were lost for say 1/40 of a second, the maximum error encountered during such a loss would only be about 0.005 of an inch. In accordance with the invention, a rate limit circuit may be provided in the discriminator 38 shown in FIGURE 1. The discriminator 38 shown in the programmed system of FIGURE 1 is shown in block diagram form in FIGURE 6. The discriminator shown in FIGURE 6, except for the rate limit circuit of the invention, is described in the above-identified patents, and particularly in Patent No. 2,866,145. Briefly, the discriminator provides error signals for the programmed control system in response to a comparison of signals indicative of the programmed position and signals indicative of the actual position. Signals indicative of the programmed position are derived from a preamplifier 36 and applied to a signal amplifier 140. Likewise, signals from the selsyn 22 are applied to a selsyn signal amplifier 142. The two amplified signals are applied to a phase discriminator 144 which produces a composite pulse having an average direct current value indicative of the phase relationship of the two signals. These signals are applied to an error signal clipper 146, after which they are filtered in a filter 148. The filtered signals are then applied to the rate limit circuit 150 in accordance with the invention, and then applied to a stabilizing circuit 152, and then to a neutral zone 154. Signals from the neutral zone 154 are applied to the amplidyne field panel 34. Signals from the error signal clipper 146 are also applied, along with input signals from the preamplifier 36, to an excess error monitor 156 which controls a relay 158 intended to cut off the system in the presence of excessive error. A starting relay 160 is also shown in the discriminator, and must be appropriately energized in order to initiate operation. Greater detailed explanation of the discriminator shown in FIGURE 6 may be found in the Patent No. 2,866,145 as mentioned. However, the discriminator there described, does not include the rate limit circuit 150 in accordance with the invention. Briefly, the rate limit circuit 150 is provided to limit the rate of change of signals derived from the filter 148 before they are applied to the stabilizing circuit 152.

FIGURE 7 shows a circuit diagram of one embodiment of the rate limit circuit 150 which may be used in the discriminator 38. In FIGURE 7, signals from the filter 148 are applied to the control electrode of an amplifier triode tube 170. Signals are derived from a cathode follower circuit of the amplifier tube 170 and applied to the stabilizing circuit 152. These signals are also applied through a differentiating circuit 172 and potentiometer 173 back to the control electrode of a feedback tube 174. Signals are derived from the feedback tube 174 in a cathode follower circuit and applied through a neutral zone diode network 176 to a reference resistor 177. These signals are compared to the voltage across the reference resistor 177, and the difference is amplified in a pentode tube 178. The output of the pentode tube 178 is a negative feedback representative of the rate of change of the input signal (as passed by the differentiating circuit 172). Hence, when this feedback signal is applied to the control electrode of the amplifier tube 170, it serves to limit the rate at which signals from the filter 148 may change. The neutral zone network 176 is provided so as to limit the feedback of voltages to those which exceed a predetermined level, namely the conduction level of the diodes forming the neutral zone network 176.

FIGURE 8 shows another rate limiting circuit which is provided for the same purpose as the rate limiting circuit of FIGURE 7. Signals from the filter 158 are applied with respect to the ground bus 70 to a network comprising four rectifiers or diodes 190, 192, 194, 196, these diodes being connected in series pairs, and the pairs connected in parallel. The network is connected serially between the +300 volts bus 80 and the —300 volts bus 82 by resistors 198, 200. Output signals are derived from the junction of one pair of diodes 194, 196. A capacitor 202 is coupled across this output circuit. Input signals are applied to the junction of the other pair of diodes 190, 192. Normally, signals at the input of the circuit shown in FIGURE 8 are at the same potential as signals at the output of the circuit. Current flows from the +300 volts bus 80 down through the resistor 198, splitting into the two diode branches and downward through the resistor 200 to the —300 volts bus 82. If the input signal applied to the circuit of FIGURE 8 were to increase rapidly in a positive direction, as it might in the absence of pulses or as it might in response to a transient condition, it is desired to limit the signals which appear at the output so as to maintain as nearly normal operation as possible. If, as assumed, the signal input increased rapidly in a positive direction, the diode 192 would conduct an increased amount of current, and the diode 190 would be cut off. The junction of the diode 192 and the resistor 200 would increase in a positive direction also and hence the diode 196 would be cut off. Current from the +300 volts bus 80 would then flow downward through the resistor 198 and the diode 194 and charge the capacitor 202 at a rate determined by the value of the capacitor 202 and the resistor 198. These values would be selected so that the capacitor 202 would charge relatively slowly with respect to the rapid increase in voltage at the input circuit so that the output will be changed only a relatively small amount. Once the capacitor were appropriately charged, the circuit would attain its normal condition with all four diodes conducting substantially equal currents as previously. If the input voltage decreased rapidly in a negative direction, the opposite effect would take place with the diodes 192, 194 being cut off. The capacitor 202 would slowly discharge through the diode 196 and the resistor 200.

FIGURE 9 shows still another embodiment of the invention for limiting the rate of change of signals from the filter 148 before these signals are applied to the stabilizing circuit 152. The operation of the circuit of FIGURE 9 is similar in principle to the operation of the circuit in FIGURE 8, inasmuch as the circuit of FIGURE 9 utilizes the output capacitor 202 for limiting the rate of change of the output voltage. The capacitor 202 is coupled between the ground bus 70 and the junction of an NPN transistor 214 and a PNP transistor 216, these transistors 214, 216 being serially coupled between buses 210, 212 of suitable potential by resistors 218, 220. The bases of the transistors 214, 216 are coupled together and coupled to the input. Normally, some current is flowing through the series circuit comprising the resistor 218, the NPN transistor 214, the PNP transistor 216 and the resistor 220. Any sudden change in voltage at the input circuit causes one transistor to turn on more fully and causes the other transistor to turn off by substantially the same amount. This condition serves, in effect, to either charge or discharge the capacitor 202 depending upon the direction taken by the change in input voltage. Thus, the circuit of FIGURE 9 provides a suitable rate limiting circuit utilizing transistors.

Although the invention has been described in specific embodiments and the operation has been explained in what is considered to be the best modes of operation, it is to be understood that the embodiments shown and described are merely illustrative, and that the invention is not limited to such embodiments or operation since alterations and changes will suggest themselves to persons skilled in the art, such changes and alterations being within the spirit and scope of this invention.

What I claim as new and desire to secure by Letters Patent of the United States is:

1. In a system for developing a plurality of alternating electrical signals from a single source, said plurality of alternating electrical signals having similar electrical qualities and a predetermined phase relationship; said system having means for integrating square wave signals, wave-shaping means coupled to said integrating means for forming said integrated signals into desired signals, and means including a phase shift device and a transformer coupled to said wave-shaping means for deriving at least two output signals having said predetermined phase relationship; the improvement comprising square wave producing means adapted to be coupled to said source and to said integrating means, said square wave producing means being capable of producing said square wave signals normally in response to said source signals and further being capable of producing square wave signals of a predetermined frequency in the absence of said source signals.

2. In a system for developing a plurality of alternating current electrical signals having similar electrical qualities and a predetermined phase relationship; said system having a source of reference signals, means for integrating rectangular wave signals, wave-shaping means coupled to said integrating means for forming first substantially sinusoidal wave signals from said integrated signals, phase shifting means coupled to said wave-shaping means for producing second substantially sinusoidal wave signals having a shifted phase relative to the phase of said first sinusoidal wave signals, and transformer means coupled to said phase shifting means and to said wave-shaping means for producing two output alternating current electrical signals therefrom, said output signals having said predetermined phase relationship and said similar electrical qualities; the improvement comprising means adapted to be coupled between said source and said integrating means for producing substantially rectangular waves in response to said reference signals and producing square waves of a predetermined frequency in the absence of said reference signals.

3. In a program control system wherein a reference control pattern is stored on a data storage medium, said system having first means coupled to said storage medium for deriving reference electrical signals therefrom to synchronize a device that reproduces said pattern, second means for integrating rectangular wave electrical signals, third means coupled to said second means for producing first substantially sinusoidal alternating current electrical signals from said integrated signals, additional circuit means coupled to said first, second, and third means for producing second substantially sinusoidal alternating current electrical signals, and transformer means coupled to said third means and to said additional circuit means for deriving at least two output electrical signals therefrom; the improvement comprising fourth means adapted to be coupled between said first and second means for producing rectangular wave alternating current electrical signals in response to said reference electrical signals and producing rectangular wave signals having a predetermined frequency in the absence of said reference electrical signals.

4. In a program control system having a reference pattern stored on a data storage medium, means coupled to said data storage medium for deriving reference signals therefrom, means for integrating square wave alternating signals, means coupled to said integrating means for producing substantially sinusoidal alternating current signals in response to said integrated signals, first amplifying means coupled to said sinusoidal producing means for amplifying a portion of said substantially sinusoidal alternating signals, means coupled to said sinusoidal producing means for shifting the phase of another portion of said substantially sinusoidal alternating signals, second amplifying means coupled to said phase shifting means for amplifying the phase shifted portion of said substantially sinusoidal alternating signals, and transformer means respectively coupled to both said amplifying means for producing substantially sinusoidal alternating current signals having predetermined phase relationships with each other; the improvement comprising multivibrator means adapted to be coupled between said deriving means and said integrating means for producing square wave alternating signals, said multivibrator means being capable of producing square wave alternating signals in response to said reference signals and being capable of producing square wave alternating signals of a predetermined frequency in the absence of said reference signals.

5. In a program control system for controlling object motion wherein a channel of reference information and at least one channel of control information are stored in a data storage medium in the form of electrical signals having a phase relationship representative of the object motion, wherein first means are coupled to said control channel for deriving signals therefrom, and wherein discriminator means are provided for producing error signals for controlling said object motion; the improvement comprising generating means adapted to be coupled to said first deriving means and to said discriminator means for producing control signals in response to said derived signals and for producing control signals of predetermined characteristics in the absence of said derived signals.

6. In a programmed control system wherein a reference channel of information and at least one control channel of information are stored in a data storage medium in the form of electrical signals having a phase relationship representative of the programmed operation, wherein first means are coupled to said control channel for deriving control signals therefrom, wherein second means are coupled to said reference channel for deriving reference signals therefrom, wherein discriminator means are coupled to said second deriving means for producing error signals indicative of the phase relationship of control signals and said derived reference signals, and wherein operating means are coupled to said discriminator means for controlling the operation of an object in response to said error signals; the improvement comprising generating means adapted to be coupled between said first deriving means and said discriminator means for producing control signals of a characteristic similar to and in response to said derived control signals and for producing control signals of a predetermined characteristic when said derived control signals are faulty.

7. In a system for controlling the motion of an object wherein a reference channel of information and at least one control channel of information are stored in a data storage medium and each channel is available in the form of electrical signals having a phase relationship representative of the desired object motion, wherein first means are coupled to said control channel for deriving control signals therefrom, wherein second means are coupled to said reference channel for deriving reference signals therefrom, wherein third means are provided for generating signals indicative of the actual motion of said object, wherein discriminator means are coupled to said third means for producing error signals indicative of the phase relationship of said actual operating signals and control signals, and wherein operating means are coupled to said discriminator means for controlling the motion of said object in response to said error signals; the improvement comprising generating means adapted to be coupled to said first deriving means and to said discriminator means for supplying control signals to said discriminator means, said control signals having a characteristic similar to said derived control signals and being produced in response to said derived control signals, and for supplying control signals of a predetermined characteristic to said discriminator means during the time said derived control signals are faulty.

8. The position control system as defined in claim 7, wherein said generating means include a multivibrator for producing said control signals in response to said derived control signals and further include timing circuits coupled to said multivibrator for timing the operation of said multivibrator as determined by said derived control signals prior to their becoming faulty.

9. In a control system having means for developing electrical signals indicative of the condition of an object being controlled, a source of control electrical signals, and comparator means for developing an error signal indicative of the phase relationship of said condition indicating signals and said control signals, the improvement comprising means adapted to be coupled to said comparator means for limiting the rate of change of said error signal and for producing output signals in response to said limited error signal.

10. In a control system wherein a reference channel of information and at least one control channel of information are stored in a data storage medium and each channel is available in the form of electrical signals having a phase relationship representative of a desired operation, wherein means are provided for developing signals representative of the actual operation of said system, and wherein means are provided for comparing the phase relationship of said actual signals and control signals derived from said one control channel and for developing an error signal proportional to said phase relationship; the improvement comprising means adapted to be coupled to said comparing means for limiting the rate of change of said error signal, amplifying means coupled to said limiting means, and means coupled to said amplifying means for producing control signals therefrom.

11. A control system as defined in claim 10, wherein said means for limiting comprises a negative feedback circuit and a differentiating circuit for limiting the rate of change of said error signal.

12. The control system as defined in claim 10, wherein said limiting means comprises a capacitor, and means associated therewith for charging or discharging said capacitor at a predetermined rate and thereby limiting said rate of change of said error signal.

No references cited.

IRVING L. SRAGOW, *Primary Examiner.*